(No Model.) 5 Sheets—Sheet 2.

C. A. WELLER.
SCREW CUTTING MACHINE.

No. 348,365. Patented Aug. 31, 1886.

WITNESSES:

INVENTOR:
C. A. Weller
BY Munn & Co.
ATTORNEYS.

(No Model.)  5 Sheets—Sheet 3.

C. A. WELLER.
SCREW CUTTING MACHINE.

No. 348,365.  Patented Aug. 31, 1886.

WITNESSES:  INVENTOR:
C. A. Weller
BY
ATTORNEYS.

(No Model.)  
5 Sheets—Sheet 4.
C. A. WELLER.
SCREW CUTTING MACHINE.
No. 348,365. Patented Aug. 31, 1886.
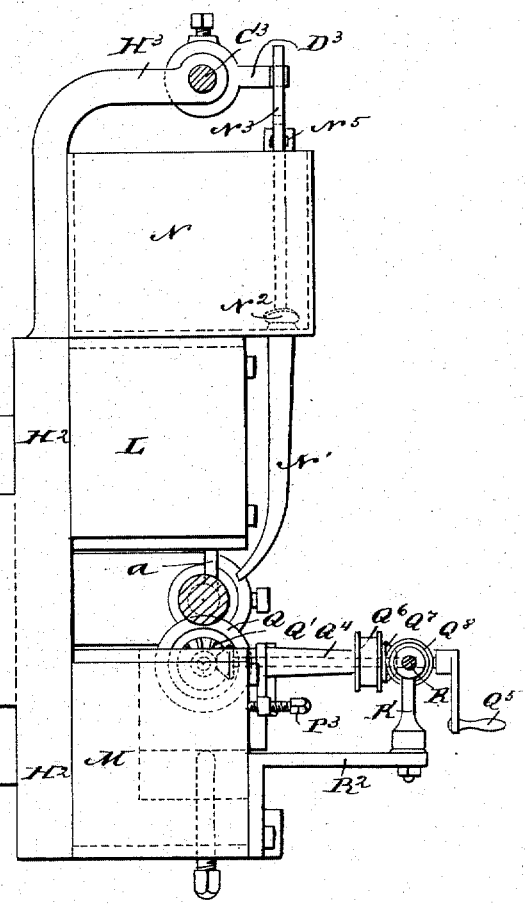
Fig. 5.
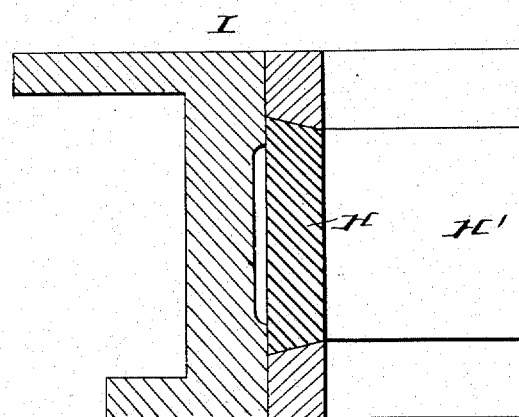
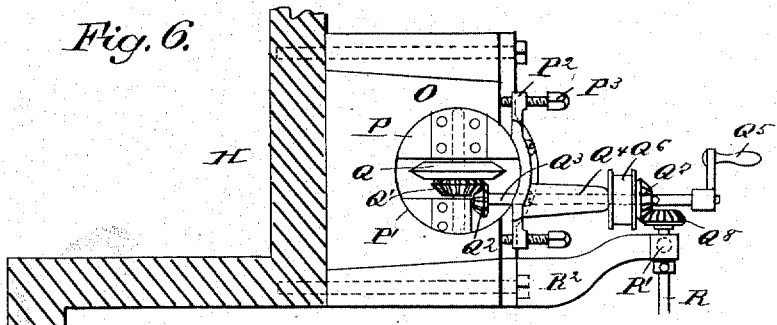
Fig. 6.
WITNESSES:
INVENTOR:
C. A. Weller
BY Munn & Co
ATTORNEYS.

(No Model.)   5 Sheets—Sheet 5.

C. A. WELLER.
SCREW CUTTING MACHINE.

No. 348,365.  Patented Aug. 31, 1886.

WITNESSES:

INVENTOR:
C. A. Weller
BY Munn & Co
ATTORNEYS.

UNITED STATES PATENT OFFICE.

CHESTER A. WELLER, OF CROTON LANDING, ASSIGNOR OF ONE-HALF TO ELGER & ELGER, OF NEW YORK, N. Y.

SCREW-CUTTING MACHINE.

SPECIFICATION forming part of Letters Patent No. 348,365, dated August 31, 1886.

Application filed January 11, 1886. Serial No. 188,269. (No model.)

*To all whom it may concern:*

Be it known that I, CHESTER A. WELLER, of Croton Landing, in the county of Westchester and State of New York, have invented a new and Improved Screw-Cutting Machine, of which the following is a full, clear, and exact description.

The object of my invention is to provide a new and improved screw-cutting machine which can also be used for twisting metal rods, and is simple in construction, operates rapidly, and produces perfect screws of different kinds.

The invention consists in the construction and combination of parts and details, as will be fully described and set forth hereinafter, and then pointed out in the claims.

Reference is to be had to the accompanying drawings, forming a part of this specification, in which similar letters of reference indicate corresponding parts in all the figures.

Figure 1:
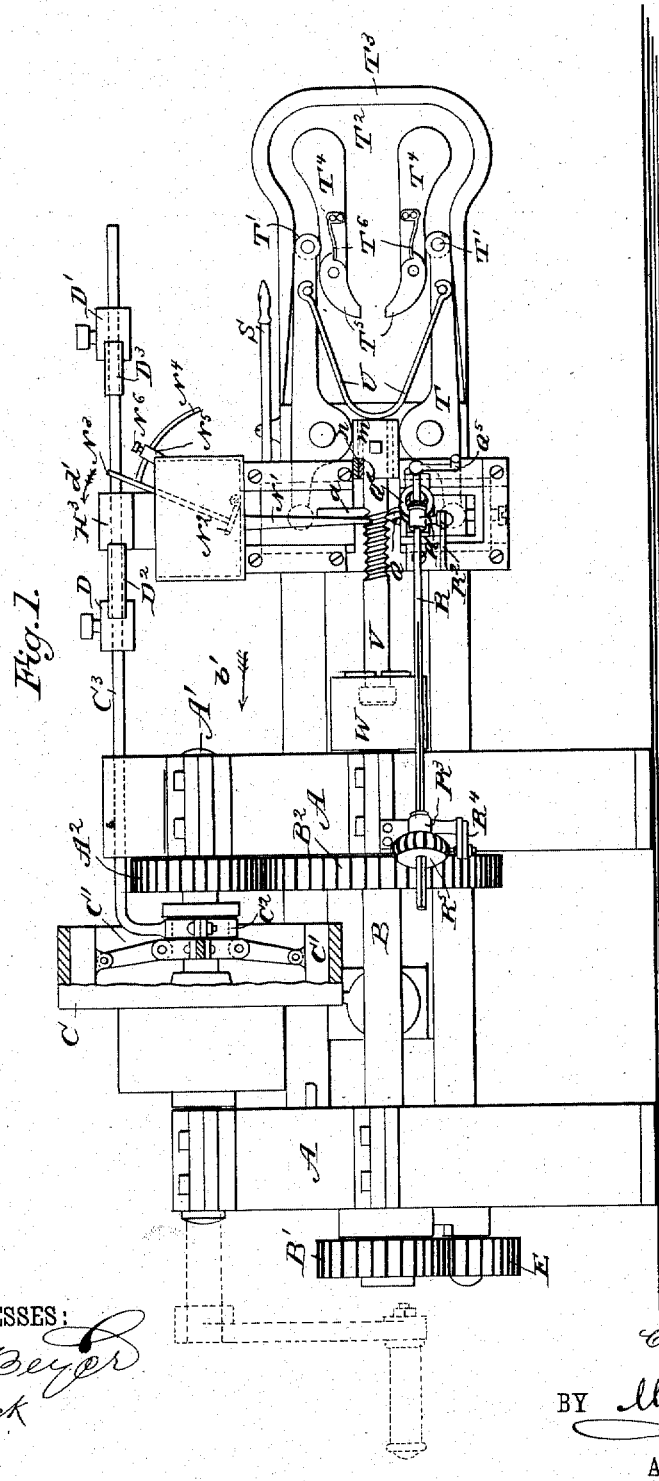
Figure 2:
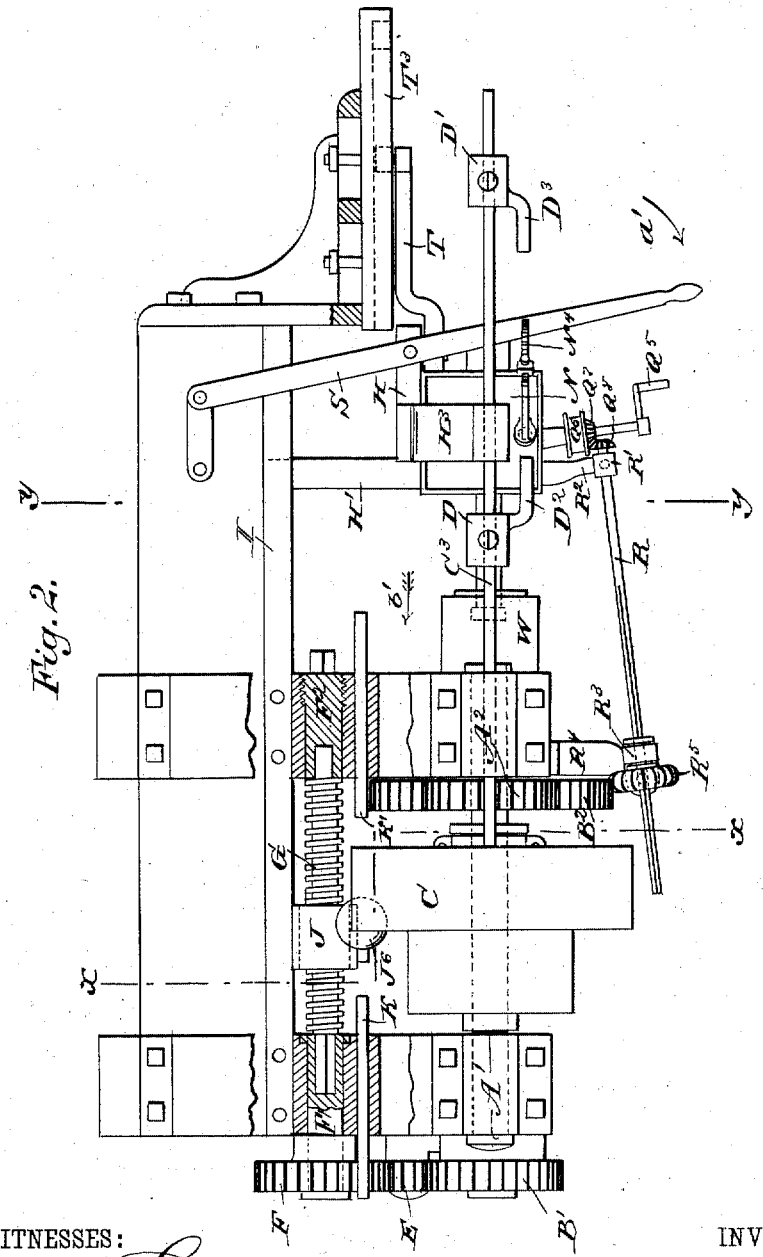
Figure 3:
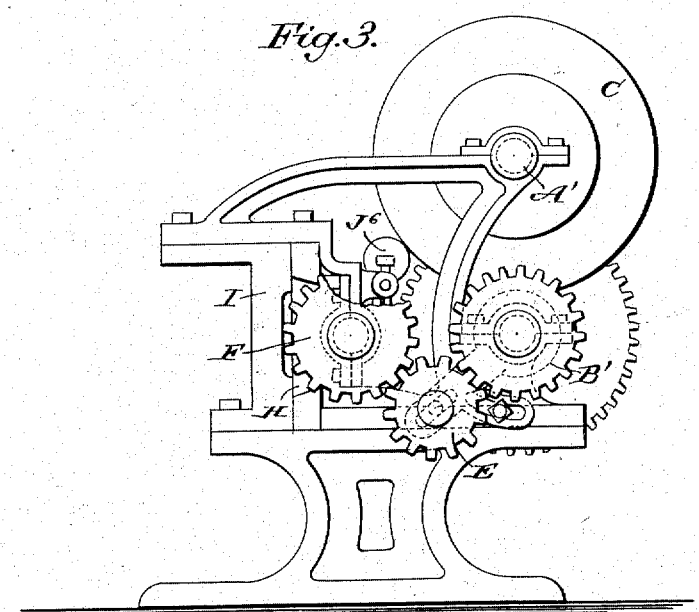
Figure 4:
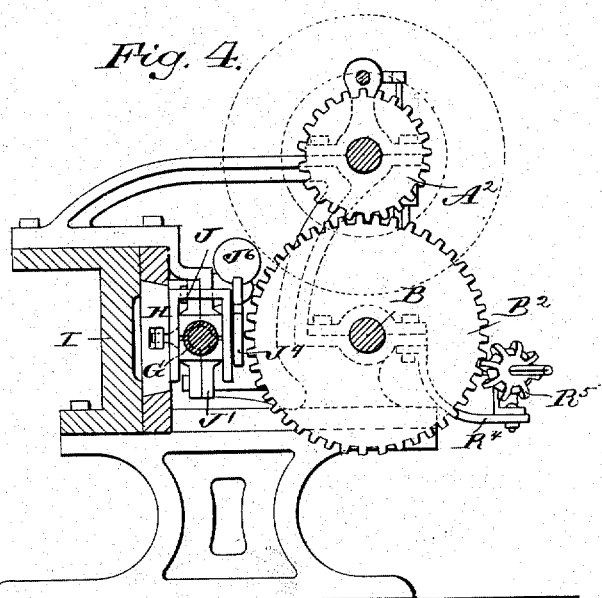
Figure 7:
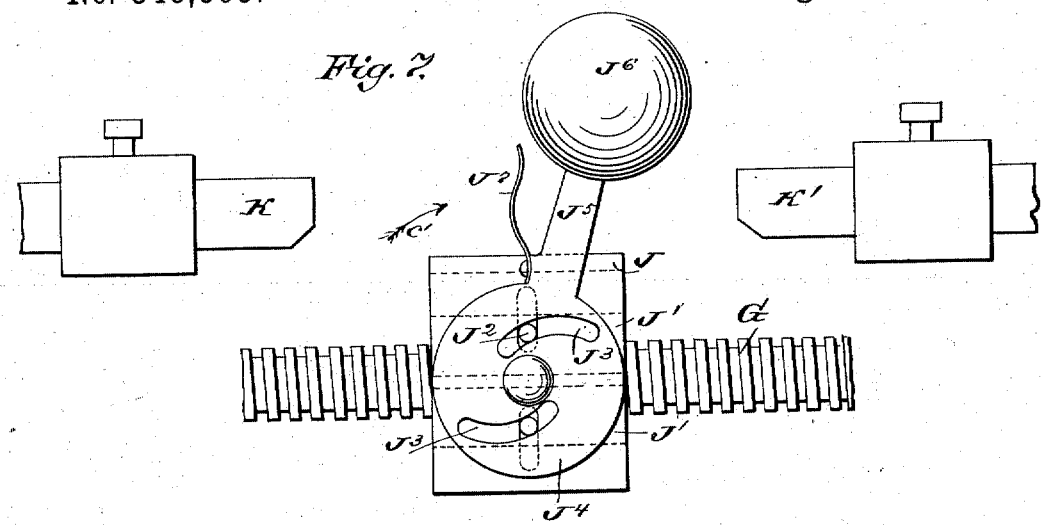
Figure 8:
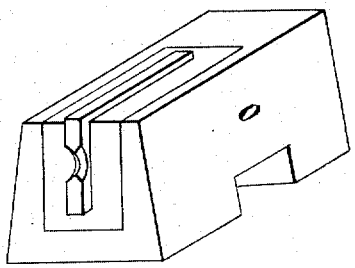
Figure 9:
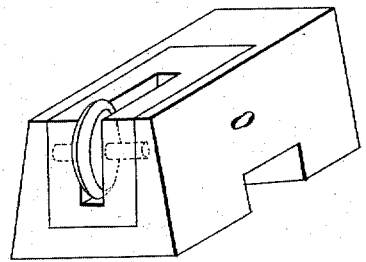
Figure 10:
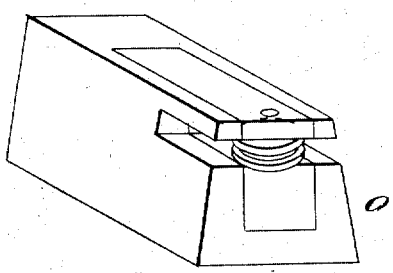
Figure 11:
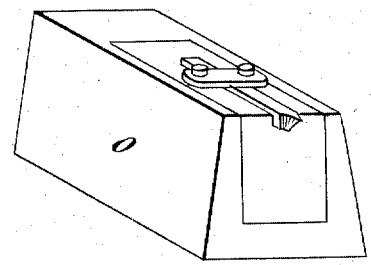

Figure 1 is a side view of my improved machine for swaging and milling screws, parts being broken out and others in section. Fig. 2 is a plan view of the same, parts being broken out and others in section. Fig. 3 is a rear view of the same. Fig. 4 is a cross-sectional view of the same on the line $x$ $x$, Fig. 2. Fig. 5 is an enlarged cross-sectional view on the line $y$ $y$, Fig. 2. Fig. 6 is an enlarged detail plan view of the mechanism for operating the milling-tool. Fig. 7 is an enlarged detail side view of the automatic clutch for throwing the tool-carriage in action. Figs. 8 and 11 are enlarged detail perspective views of two different tool-holding blocks. Figs. 9 and 10 illustrate blocks carrying two forms of gripping-disks for use in twisting rods.

In the frame A a shaft, A', is journaled, on which is rigidly mounted the cog-wheel $A^2$, engaging with a cog-wheel, $B^2$, on the shaft B, also journaled in the frame A and carrying at its outer end the cog-wheel B', which is rigidly mounted. On the shaft A' the stepped belt-pulley C is mounted, which contains the toggle-lever clutching device C', mounted on the shaft A', and operated by the collar $C^2$ on the end of the rod $C^3$, on which two adjustable blocks, D and D', are held by screws, said blocks being provided with the arms $D^2$ and $D^3$, respectively, for a purpose that will be set forth hereinafter.

By shifting the sleeve of the clutching device the toggle-levers are loosened, and thus the belt-pulley cannot revolve the shaft A'; but as soon as the sleeve of the clutch is forced toward the interior of the pulley the toggle-levers are straightened and the belt-pulley is locked firmly on the shaft A', which is revolved by the belt passed over said pulley.

The cog-wheel B' on the end of the shaft B engages with an intermediate cog-wheel, E, of greater or less diameter, which in turn engages with the cog-wheel F, mounted on one end of a socket, F', journaled in one part of the frame A, which socket serves to receive the squared end of a screw, G, the opposite end of which screw forms a pivot passed into a screw-socket, $F^2$, screwed into an aperture in the frame A, said screw-socket being provided with a squared projection, on which a key can be applied for the purpose of screwing said socket in place. The screw can thus be removed very easily to be replaced by others having a different pitch, as circumstances may require.

A dovetail slide or carriage, H, is mounted to slide in the horizontal part I of the frame of the machine, said part I being placed edgewise and in the direction of the length of the machine, so that the said dovetail slide H also slides in the direction of the length of the machine. On said slide H a box, J, is secured, which contains the two half screw-sockets, J', which can engage with the screw G, passing between them, said half screw-sockets being provided with the cam-pins $J^2$, passed through the slots $J^3$ in the disk $J^4$, pivoted at its center on the outer surface of the box J, which disk is provided with an arm, $J^5$, carrying a weight, $J^6$, on its end, and said arm is provided with a projecting spring, $J^7$. (All shown in Fig. 7.)

In the frame A the two bars K and K' are held by binding-screws in such a manner that they project a greater or less distance from the adjacent faces or sides of said frame, and can strike against the arm $J^5$ or the weight $J^6$ on the same, said bars being shown in Figs. 2 and 7.

The slide or carriage H is provided with the laterally-projecting arm H', on which the upright part H² is formed, provided at its upper end with a bent end, H³. On said arm H' the two tool-block holders L and M are held, and above the block L an oil or water tank, N, is provided, from the bottom of which the spout N' projects, the upper end of which can be closed by the valve N², pivoted on the bottom of the tank N, and provided with the upwardly-projecting stem N³, having the segmental arm N⁴, passed through the apertured lug N⁵ on the end of the tank, which lug is provided with a binding-screw, N⁶, for locking the arm N⁴ in place.

The rod C³, previously mentioned, is guided in the upper end of the arm H³, and the arms or projections D² and D³ on the blocks D and D', held by binding-screws on said rod C³, serve to strike the upper end of the rod N³, and thus open and close the valve N².

The tool-holding blocks O are wedge-shaped, and are placed in suitable recesses in the block-holders L and M on the end of the arm of the carriage. In said block O the tools and gripping-disks are held, which tools may consist of ordinary screw-cutting tools, as those shown in Figs. 8 and 11, or of swaging disks or wheels, as shown at $q$, Fig. 5, or of milling-disks or shaped wheels for producing screws or a certain kind, while the gripping-disks, as shown in Figs. 9 and 10, are used in twisting rods, as hereinafter described.

As the swaging-disk must have different inclinations in its block, according to the pitch of the thread, the circular block P, carrying the swaging-disk Q, is mounted to turn in an aperture, P', in the lower tool-holding block, and said circular block P is provided with a cross-piece, P², having the set-screws P³, whereby by drawing up one and loosening the other the cylindrical block P can be shifted, and thus the inclination of the swaging-wheel Q changed. On the same axis with the disk or wheel Q, the bevel cog-wheel Q' is mounted, which engages with the bevel cog-wheel Q² on the shaft Q³, passed through a neck, Q⁴, on the cross-piece P², and provided at its outer end with a handle, Q⁵. On said shaft Q³ are also mounted the belt-pulley Q⁶ and the bevel cog-wheel Q⁷, engaging with the bevel cog-wheel Q⁸ on the end of the shaft R, journaled in the standard R' on the end of the arm R² of the lower tool-holder, said cog-wheels Q⁷ and Q⁸ having rounded teeth to adapt them to keep in engagement at different inclinations of the shaft R to the shaft Q³.

The shaft R is passed through a guide, R³, mounted to turn on an arm, R⁴, of the frame, and said shaft R also passes through a cog-wheel, R⁵, having rounded teeth and engaging with the cog-wheel B². The shaft R passes loosely through the cog-wheel R⁵—that is, the shaft is provided with a groove for receiving the key on the wheel—so that the shaft can slide through the wheel, but the shaft can be compelled to turn with the wheel.

The tool-holding blocks are held in their receptacles by means of suitable screws. The lever S, pivoted to a link which is pivoted on the frame, is connected with the sliding carriage. On the end of the carriage two levers, T, are pivoted, which are also connected with the tool-holding blocks O, and can move toward and from each other. At the opposite ends said levers are provided with rollers T', which can run in the grooves T², formed in a projecting plate, T³, on the end of the machine by raised portions T⁴ on said plate T³ and by flanges along the edges of the plate, which raised portions are provided at the ends nearest the working parts of the machine, with the pivoted curved pieces T⁵, which are pressed toward each other by springs T⁶, secured on the projections T⁴ and acting on the parts T⁵. A V-shaped spring, U, is connected with both levers T and presses the ends, carrying the rollers T' toward each other. On that end of the shaft B opposite the one carrying the cog-wheel B' the automatic chuck W, which may be of any approved construction, is mounted, which serves to receive the head of a bolt, V.

On the end of the carriage the sleeve $m$ is held, which serves to receive a bushing, $n$, into which bushing the end of the bolt is passed. According to the thickness of the bolt, bushings of different thicknesses are placed in the sleeve $m$. One end of the bolt is held in the chuck W and the other end is held by the bushing of the sleeve, and thus jarring and shaking of the bolt during the time that it is being cut is prevented.

The operation is as follows: When the machine is not in operation the belt revolves the belt-pulley C; but the said pulley is not locked on the shaft A', and consequently does not revolve the same. The bolt V is held in the chuck W by its head, and the opposite end of the bolt is passed into the bushing $n$ in the sleeve $m$. The bolt may be heated or cold, as may be desired. To start the machine the lever S is swung in the direction of the arrow $a'$, Fig. 2, whereby the carriage is moved in the direction of the arrow $b'$, Fig. 2. As the carriage is moved in the direction of the arrow $b'$, the upper part, H³, of the arm H² on the carriage strikes the block D, thereby moving the rod C³ in the direction of the arrow $b'$, which rod, acting on the clutch C', causes the same to lock the pulley C on the shaft A', whereby said shaft is revolved. At the same time the arm D³ of the block D' strikes the upper end of the lever N³ and tilts the same, whereby the valve N² is opened to permit the oil or water to flow from the tank N, through the spout N', upon the bolt V. The blocks in which the tools are held are separated during the movement of the carriage in the direction of the arrow $b'$. The spring U can press those ends of the levers T opposite the ones on which the tool-holding blocks are held together as the rollers T' on the ends of said levers T are not yet on the raised portions T⁴ of the plate T³. The cutting and milling tools are thus short distances from the bolt, and at the moment that the machine is started they are a distance from the head of the bolt equal to the length of that part of the bolt that is to remain uncut or smooth. During the time that the carriage is being moved in the direction of the arrow $b'$ by the operator shoving it with the lever S, the screw-sockets $J'$ in the box J are disengaged from the screw G; but when the carriage arrives at the end of its movement in the direction of the arrow $b'$, the left-hand bar K, Figs. 2 and 7, strikes the spring $J^7$ of the arm $J^5$, thereby turning the disk $J^4$ in the direction of the arrow $c'$, whereby the cam-pins $J^2$ on the screw-sockets $J'$ will move toward each other, and the screw-sockets will thus be clamped on the screw. As the said box J is fastened on the carriage and the screw is revolved from the shaft $A'$ by means of the cog-wheels described, the screw will move the carriage in the inverse direction of the arrow $b'$. The shaft B, carrying the chuck in which the bolt is held, begins to revolve as soon as the shaft $A'$ is revolved. The carriage or slide is now moved in the inverse direction of the arrow $b'$ by the action of the screw, and as soon as the carriage begins to move the rollers $T'$ on the levers T travel up the parts $T^5$ and the outer edges of the projections $T^4$, whereby the cutting and swaging devices are pressed against the sides of the bolt and cut and finish the screw-thread on the same. Said parts $T^5$ and the projections $T^4$ act as cams on the rollers $T'$. According to the formation of the said cams the screw part will remain cylindrical or it will be tapered. As shown, the cams are so arranged that the screw-threaded part is cylindrical, and by the time that the cutters get near the end of the screw part the rollers $T'$ are moved from each other very suddenly by the rounded edges of the projections $T^4$, whereby the cutting implements are pressed toward each other and form a tapered end on the screw-threaded part of the bolt, and finally are moved so close together as to cut off the end of the bolt. The bolt is thus provided with a gimlet-point. When the carriage arrives at the end of its movement in the inverse direction of the arrow $b'$, the arm $D^3$ of the block $D'$ on the rod $C^3$ strikes the upper end of the rod $N^3$ and swings the same in the direction of the arrow $d'$, whereby the valve $N^2$ in the bottom of the tank N is closed and the flow of oil or water ceases when the screw is cut. Then the bolt and the part remaining in the bushing of the sleeve or socket $m$ are removed, and by means of the lever S the carriage is moved in the direction of the arrow $b'$, whereby the cutting implements are separated, in the manner set forth, and when the carriage has moved a sufficient distance in the direction of the arrow $b'$ a fresh bolt is placed in the chuck and the machine is again started. The machine is stopped automatically when the screw is cut as the upper part $H^3$ of the arm $H^2$ on the carriage strikes the block $D'$ on the rod $C^3$, thereby shifting the clutch and releasing the pulley. By adjusting the blocks D $D'$ in different positions on the rod $C^3$, the machine can be adjusted to cut screws of any desired length, and thus is adjusted to stop automatically and to cut off the flow of oil or water at the proper time. Whenever the carriage arrives at the end of its stroke in the inverse direction of the arrow $b'$, the right-hand bar $K'$ strikes the arm $J^5$ of the disk $J^4$ and swings the same in the inverse direction of the arrow $c'$, Fig. 7, thereby disengaging the screw-sockets $J'$ from the screw G, so as to permit of moving the carriage in the direction of the arrow $b'$. The swaging-tool Q is operated with great rapidity from the cog-wheel $B^2$ by means of the cog-wheel $R^5$ and the intermediate gearing. The swaging-tool must revolve quite rapidly, so as to make a clean and sharp thread. If desired, the swaging tool can be revolved by hand by means of the handle $Q^5$, or by means of a belt passed over the pulley $Q^6$ and over a counter-shaft.

In some cases it may not be necessary to revolve the swaging-wheel by means of a separate mechanism, as the rotary movement the same receives from the screw-bolt may be sufficient, especially in cases where a fine-cut thread is not required.

The parts $T^5$, pivoted on the ends of the cams, can swing from each other when the rollers $T'$ on the ends of the levers T are moved in the direction of the arrow $b'$, along the inner edges of the cam-projections $T^4$.

When the machine is to be used for twisting metal rods, the carriage remains stationary, one end of the rod to be twisted being clamped in the chuck W and the other end between two suitable gripping-disks, as those shown in Figs. 9 and 10, the holders O being held in the tool-holding blocks L and M on the carriage, and adjusted to grip the rod by the set-screw at the bottom of the block M. The shaft $A'$ being revolved by means of the crank-handle shown dotted in Fig. 1, or by the mechanism shown and described, the rod is given the required twist, the gripping-disks by their rotation permitting of its decrease in length when twisted.

Having thus fully described my invention, I claim as new and desire to secure by Letters Patent—

1. In a machine for making screws, the combination, with the main driving-shaft, of a chuck-shaft and a screw operated thereby, and of a carriage in which the screw-cutting devices are held, which carriage automatically engages itself with said screw so as to be moved by the same, substantially as herein shown and described.

2. A machine for making screws, constructed with a sliding carriage in which movable screw-cutting tools are held, levers pivoted on the carriage and acting on the movable holders for the screw-cutting tools, and of fixed cams acting on said levers, combined and arranged for operation substantially as herein shown and described.

3. A machine for making screws, constructed with a sliding carriage, holders for screw-cutting tools on said carriage, an oil or water tank on the carriage above the cutting devices, levers connected with the tool-holders, and fixed cams acting on said levers, combined and arranged for operation substantially as herein shown and described.

4. In a machine for making screws, the combination, with a frame, of a screw mounted in the same, mechanism for revolving the screw from the main driving-shaft, a chuck-shaft revolved from the driving-shaft, a sliding carriage provided with a screw-box through which the screw passes, and holders for the screw-cutting tools on the carriage, substantially as herein shown and described.

5. In a machine for making screws, the combination, with a frame, of a screw mounted to revolve in the same, mechanism for revolving the screw from the main driving-shaft, a chuck-shaft revolved from the main driving-shaft, a sliding carriage in the frame, a box on the carriage, screw-sockets in said box, between which sockets the screw passes, mechanism for pressing the screw-sockets in the box toward or from each other, and fixed bars or rods acting on said mechanism and tool-holders on the carriage, substantially as herein shown and described.

6. In a machine for making screws, the combination, with the frame, of a screw mounted to revolve in the same, mechanism for revolving the screw from the driving-shaft, a chuck-shaft operated from the driving-shaft of the machine, a sliding carriage, tool-holders on the same, a box on the carriage, screw-sockets in the box, between which screw-sockets the screw passes, a disk having segmental slots through which pins in the screw-sockets pass, an arm on said disk, and bars held in the frame of the machine for tripping the arm on the disk and thus automatically opening and closing the screw-sockets, substantially as herein shown and described.

7. In a machine for making screws, the combination, with the frame, of a driving-shaft, the socket F', the screw G, having one squared end passed into the said socket, the screw-socket F², screwed into the frame and having an aperture for a pivot on one end of the screw, a sliding carriage on the frame, an automatic device for closing the screw-sockets in the carriage, mechanism for revolving the socket F' from the driving-shaft of the machine, a chuck-shaft operated from the driving-shaft of the machine, and of tool-holders on the carriage, substantially as herein shown and described.

8. In a machine for making screws, the combination, with the frame, of a sliding carriage operated by a screw driven from the main shaft, a chuck-shaft driven from the main shaft, movable tool-holders on the carriage, the levers T, pivoted on the carriage and connected with the tool-holders, the spring U, acting on the levers, and the fixed plate T³, provided with cams acting on the ends of the levers connected with the tool-holders, substantially as herein shown and described.

9. In a machine for making screws, the combination, with the frame, of a sliding carriage operated by a screw driven from the main shaft of the machine, a chuck-shaft operated from the main shaft of the machine, movable tool-holders on the sliding carriage, the levers T, pivoted on the carriage and connected with the tool-holders, the spring U, connected with the said levers, the plate T³, provided with a flange and the cam-projections T⁴, and the pivoted parts T⁵ at the ends of said cams T⁴, substantially as herein shown and described.

10. In a machine for making screws, the combination, with the frame, of a sliding carriage driven by means of a screw from the main shaft, a chuck-shaft driven from the main shaft, the sleeve $m$ on the carriage, the bushings $n$ in the same, movable tool-holders on the carriage, levers pivoted on the carriage and connected with the tool-holders, and fixed cams acting on said levers, substantially as herein shown and described.

11. In a machine for making screws, the combination, with the frame, of a driving-shaft, a loose pulley on the same, a clutch within the pulley, a sliding rod connected with the clutch, a sliding carriage driven by a screw from the main driving-shaft, a chuck-shaft driven from the main shaft, blocks or projections held on the sliding rod connected with the clutch, on which blocks part of the sliding carriage can act, and of cutting devices on the carriage, substantially as herein shown and described.

12. In a machine for making screws, the combination, with the driving-shaft, of a belt-pulley mounted loosely on the same, a clutch within the belt-pulley, a sliding rod connected with the clutch, a carriage operated by a screw from the main driving-shaft, a chuck-shaft driven from the main shaft, an arm on the carriage, which arm has an opening or guide at its upper end, through which the rod connected with the clutch passes, blocks held adjustably on the rod connected with the clutch, and tool-holders on the carriage, substantially as herein shown and described.

13. In a machine for making screws, the combination, with the frame, of the driving-shaft in the same, a belt-pulley mounted loosely on the driving-shaft, a clutch within the belt-pulley, a sliding rod connected with the clutch, a carriage driven by means of a screw from the main shaft, a chuck-shaft driven from the main shaft, an arm on the carriage, which arm is provided with an aperture or guide for the rod connected with the clutch, the blocks D D' on the rod connected with the clutch, the arms D² D³ on said blocks, tool-holders on the carriage, a tank above the tool-holders, and a valve in the tank, which valve is provided with a rod on which the arms D² and D³ can act, substantially as herein shown and described.

14. In a machine for making screws, the combination, with the frame, of a driving-shaft, a belt-pulley on the same, a clutch for locking the belt-pulley on the driving-shaft, a sliding rod connected with the clutch, a carriage operated from the main shaft, a chuck-shaft driven by the main shaft, a projection on the carriage acting on the blocks or projections on the rod connected with the clutch, a tank on the carriage, a valve in said tank, mechanism for opening and closing said valve automatically from the projections on the rod connected with the clutch, and tool-holders on the carriage, substantially as herein shown and described.

15. In a machine for making screws, the combination, with a frame, of a chuck-shaft driven from the main shaft, a carriage operated by means of a screw from the main shaft, tool-holders in the carriage, and gearing and a shaft for operating one of the tools from the main shaft, substantially as herein shown and described.

16. In a machine for making screws, the combination, with a frame, of a chuck-shaft driven from the main shaft, a carriage operated by a screw from the main shaft, tool-holding blocks on said carriage, a circular tool-holder in one of the blocks, and a cross-piece and screws for adjusting the inclination of said tool-holder, substantially as herein shown and described.

17. In a machine for making screws, the combination, with the frame, of a chuck-shaft operated by the main shaft, a carriage operated from the main shaft by means of a screw, tool-holders on the carriage, and mechanism for revolving one of the tools, substantially as herein shown and described.

CHESTER A. WELLER.

Witnesses:
C. C. EGER,
THEO. G. HOSTER.